United States Patent
Linder

(10) Patent No.: US 6,188,217 B1
(45) Date of Patent: Feb. 13, 2001

(54) INDUCTIVE MEASUREMENT DEVICE FOR DETERMINING DIMENSIONS OF OBJECTS

(75) Inventor: Sten Linder, Västerås (SE)

(73) Assignee: Asea Brown Boveri AB, Vasteras (SE)

( * ) Notice: Under 35 U.S.C. 154(b), the term of this patent shall be extended for 0 days.

(21) Appl. No.: 09/051,418

(22) PCT Filed: Sep. 27, 1996

(86) PCT No.: PCT/SE96/01208
§ 371 Date: May 28, 1998
§ 102(e) Date: May 28, 1998

(87) PCT Pub. No.: WO97/14014
PCT Pub. Date: Apr. 17, 1997

(30) Foreign Application Priority Data

Oct. 13, 1995 (SE) .................................................. 9503584

(51) Int. Cl.[7] .............................. G01B 7/00; G01B 7/02; G01B 7/14; G01N 27/72
(52) U.S. Cl. .................... 324/239; 324/207.17; 324/229; 324/232; 324/243
(58) Field of Search ..................... 324/207.17–207.19, 324/228–232, 239–243; 340/551

(56) References Cited

U.S. PATENT DOCUMENTS

| | | | |
|---|---|---|---|
| 4,475,083 | 10/1984 | Linder | 324/227 |
| 4,605,898 | * 8/1986 | Aittoniemi et al. | 324/243 X |
| 4,866,424 | * 9/1989 | Parks | 324/243 X |
| 5,059,902 | 10/1991 | Linder | 324/207.17 |
| 5,270,646 | 12/1993 | Kihlberg et al. | 324/207.16 |
| 5,339,029 | 8/1994 | Wagner | 324/207.17 |
| 5,493,517 | * 2/1996 | Frazier | 324/243 X |
| 5,528,141 | * 6/1996 | Kyriakis | 324/228 X |

FOREIGN PATENT DOCUMENTS 800630  1/1981  (RU) .

OTHER PUBLICATIONS

Placko et al., Thickness touchless measurements using eddy current sensors, Electric Machines and Power Systems, vol. 17, 1989, pp. 125–137.

Mor et al., The Electromagnetic Field Distribution of the Rectangular Current Frame Placed at an Arbitrary Position above a Conducting Sheet, Journal of the Franklin Institute, pp. 621–640, The Franklin Institute 0016–0032/90 Undated.

* cited by examiner

Primary Examiner—Gerard Strecker
(74) Attorney, Agent, or Firm—Pollock, Vande Sande & Amernick, R.L.L.P.

(57) ABSTRACT

A device for non-contacting measurement of a measuring object is provided. The device includes at least one pair of associated coils, including a transmitter coil and a receiver coil. The transmitter coil generates a time varying magnetic field. In the receiver coil, a voltage is induced. The voltage is dependent on the location of the transmitter coil, the receiver coil and a measuring region of a measuring object. The device comprises a U-shaped structure with two branches. A retaining part is arranged between these branches. The transmitter and receiver coils are fixed to the branches of the U-shaped structure and the measuring object is intended to be arranged centrally in the opening of the U-shaped structure.

8 Claims, 5 Drawing Sheets

INDUCTIVE MEASUREMENT DEVICE FOR DETERMINING DIMENSIONS OF OBJECTS

TECHNICAL FIELD

The present invention relates to a measurement device based on electromagnetic induction for non-contacting determination of the dimension of tubes, rods, beams, etc., of electrically conductive material. The invention may also be used for measurement on products made of graphite, electrically conductive ceramic, or the like.

The measurement device can suitably be used when manufacturing the above-mentioned products for continuous monitoring during the manufacturing process. The measurement device can also be part of a sensor in equipment for controlling the final dimension of rolled products. This results in a reduction of the rejection rate, etc.

The measurement device is based on the measuring principle which is described in U.S. patent application Ser. No. 09/051,333.

BACKGROUND OF THE INVENTION

One known method for non-contacting measurement of positions and various dimensions, such as height and width, of tubes, rods, beams or like products is to use optical methods based on shading or reflection of beams, or by processing of images taken by a video camera.

The environment in many manufacturing processes, include, above all, pollution and often high temperatures, which deteriorate the reliability and the accuracy of such equipment.

It is previously known to measure the dimensions and position of an electrically conductive measuring object by means of inductive methods. In that case, a transmitter coil is used which generates a time-varying magnetic field which induces currents in the conductive measuring object. These currents generate a magnetic field which, in turn, induces a voltage in a receiver coil. This voltage is dependent, among other things, on the shape, the conductivity, and the magnetic permeability of the measuring object, as well as on the geometrical conditions. From this voltage, under certain conditions, geometrical measures, such as distance and position of the measuring object, may be calculated. For generating a time-varying magnetic field, sinusoidal currents in the transmitter coil may be used, as described in U.S. Pat. No. 4,475,083, or a constant current which is suddenly interrupted, such as described in U.S. Pat. No. 5,059,902, may be used. The latter method is more robust from the point of view of a measurement technique and facilitates the separation of different properties of the measuring object. One problem with these measurement devices, however, is to determine the dimensions of the measuring object when its position is changed.

U.S. Pat. No. 5,270,646 discloses a method of arranging coils so as to measure the width of a strip. However, this technique can only be used for a strip of relatively limited width. Further, it is assumed for a correct function that the edge of the strip is substantially plane. For many applications, the accuracy is not sufficient, primarily when there are large distances between the strip and the measuring coils, which is due to difficulties in correctly compensating for variations in the distance.

Common to prior art devices for inductive measurement of distance, thickness and other dimensions of electrically conductive objects, derived therefrom, is that the transmitter and receiver coils are arranged with the same symmetry axis or are located on different sides of the measuring object. It also occurs that the same coil is used as transmitter and receiver coil. The magnetic field generated by the transmitter coil then becomes substantially perpendicular to the surface of the measuring object at the measuring point, or at least has a large component towards the surface of the measuring object. This results in currents and magnetic fields from different depths into the measuring object contributing to the measurement signal which thus becomes both material-dependent and dependent on the thickness and shape of the measuring object in a relatively large region around the location where measurement is to take place.

SUMMARY OF THE INVENTION

The invention comprises a U-shaped structure, in the following referred to as a "U sensor", with two branches and one retaining part arranged therebetween. During measurement, the measuring object is placed, as far as possible, centrally in the inner opening of the U sensor. The measuring principle is based on at least one transmitter coil and one receiver coil being fixed in the U sensor. These are to be placed in relation to each other such that the magnetic field generated by the transmitter coil is substantially parallel to the surface of the measuring object at a conceived measuring region. The receiver coil is placed such that a conceived field line which originates from the transmitter coil touches the measuring region at a measuring point and such that the field line in its extension reaches the receiver coil. This is achieved by a substantially symmetrical location of the coils in relation to the measuring point in question and where the transmitter coil, the measuring point and the receiver coil, as far as possible, lie on one and the same circular arc and where the circular arc relative to the measuring region is curved outwardly.

One advantageous method of supplying a transmitter coil is described in U.S. Pat. No. 5,059,902. It describes supply with a constant current which has a sufficient duration for the magnetic field to be regarded as quasi-static.

The voltage induced in the receiver coil as a function of the time after the constant current in the transmitter coil has been interrupted, at a time t1, comprises a brief voltage pulse S1 rapidly diminishing up to a time t2 and induced by the rapidly decreasing magnetic field in the air between the coils and the measuring object, and a voltage pulse S2 diminishing considerably more slowly from the time t2 and relating to the magnetic field within the measuring object which decreases slowly due to the skin effect.

On the basis of the above-mentioned symmetrical location of the coils relative to the measuring region and the location of the coils and the measuring point on the same circular arc, the position of the measuring region on an extended line between the center of the circular arc and the measuring point can be determined. The position or the distance from a fixed reference point on the line, for example the center of the arc, is determined as a linear combination of the integral of the voltage pulse S1 between t1 and t2 and the integral of the voltage pulse S2 between t2 and t3, where t3 is determined as follows:

$$M = a \cdot \int_{t1}^{t2} S1 \cdot dt + b \cdot \int_{t2}^{t3} S2 \cdot dt$$

The time t3 is preferably chosen such that t3–t2 is of the same order of magnitude as the time difference t2–t1 and where the coefficients a and b are chosen after calibration with measuring objects made from materials with different electrical conductivity such that the difference in M between the materials becomes as small as possible. If the time difference t3–t2 is chosen equal to 2(t2–t1), a and b will be substantially equal and no calibration according to the above need be made.

To be able to measure a plurality of different dimensions of the measuring object, for example height and width, a plurality of associated transmitter and receiver coils according to the invention are placed around the measuring object. The supply current of the transmitter coils is then normally interrupted at different times in order not to influence each other.

One advantage of a sensor according to the invention is that it is not particularly sensitive to deviations from the central location of the measuring object according to the above. This means that the sensor provides relevant measures of the change of the position of the measuring region if the change is smaller than 10–30% of the distance between the measuring region and any of the coils.

DESCRIPTION OF THE PREFERRED EMBODIMENTS

Figure 1:
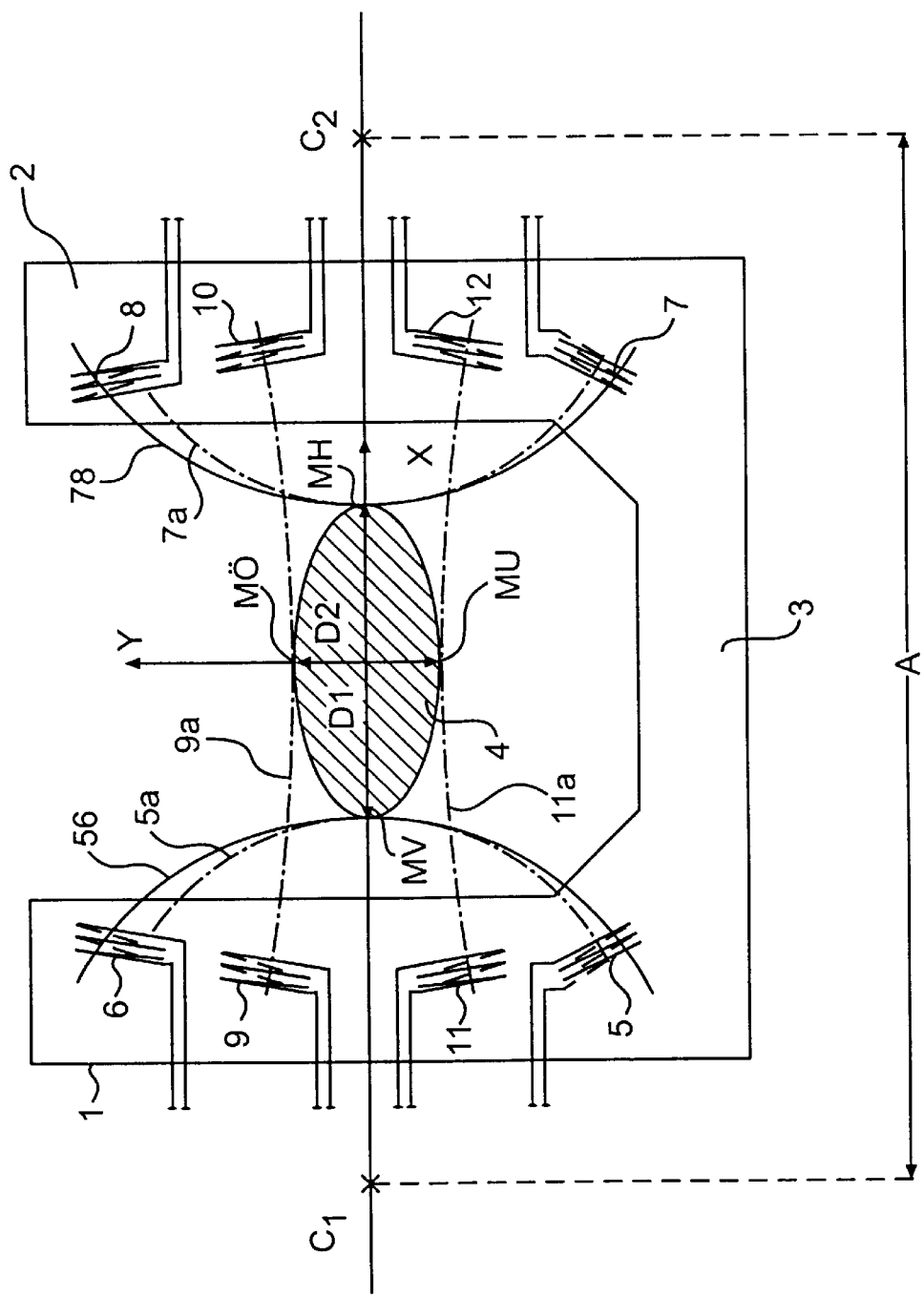
FIG. 1 shows a preferred embodiment of a U sensor according to the invention.

A preferred embodiment of a U sensor according to the invention is shown in FIG. 1, which shows the two branches 1 and 2 of the U sensor as well as a retaining part 3 located therebetween. As mentioned, the measuring object 4 is placed, as far as possible, centrally in the inner opening of the U sensor and the intention of the preferred embodiment is to determine four distances of the measuring object relative to given references.

Starting from an x-y coordinate system centrally placed in the inner opening of the sensor, two of the distances correspond to the upper, MÖ, and lower, MU, y-coordinates, respectively, of the measuring object for the respective measuring region. In a corresponding way, the other two measuring regions correspond to the lefthand, MV, and righthand, MH, x-coordinates, respectively, of the measuring object. From these four distances, the position of the measuring object in the opening, as well as the width and height thereof can be calculated.

To be able to cover the measuring region and determine the measure MV, the associated transmitter coil 5, which generates a tangential field 5a to the measuring object, and a receiver coil 6 must be in the branch 1. In a corresponding way, the associated transmitter coil 7, which generates a tangential field 7a to the measuring object, and the receiver coil 8 for determining MH must be in the branch 2.

To be able to achieve a tangential magnetic field 9a to the measuring object for determination of MÖ, the associated transmitter coil 9 must be in branch 1 and the receiver coil 10 in branch 2. The corresponding applies to the determination of MU where the transmitter coil 11, which generates a tangential field 11a to the measuring object, and the receiver coil 12 must each be situated in a respective branch.

In principle, it does not matter which of the associated coils operates as transmitter or receiver coil. From a purely practical point of view, the measurements may be performed in a plurality of different ways. A general requirement, however, is that a whole measurement sequence must be carried out in such a short time that the measuring object cannot be considered to have changed position in the opening of the U sensor during the measurement sequence. The measurement sequence may be adapted such that sensing of the voltage induced in the receiver coils is performed for each coil in succession after each other. Another method, within the scope of the invention, is that the supply currents for two transmitter coils, for example for determination of MÖ and MU, are interrupted simultaneously, and that measurement of the induced voltage in the respective receiver coils is performed simultaneously.

Figure 2:
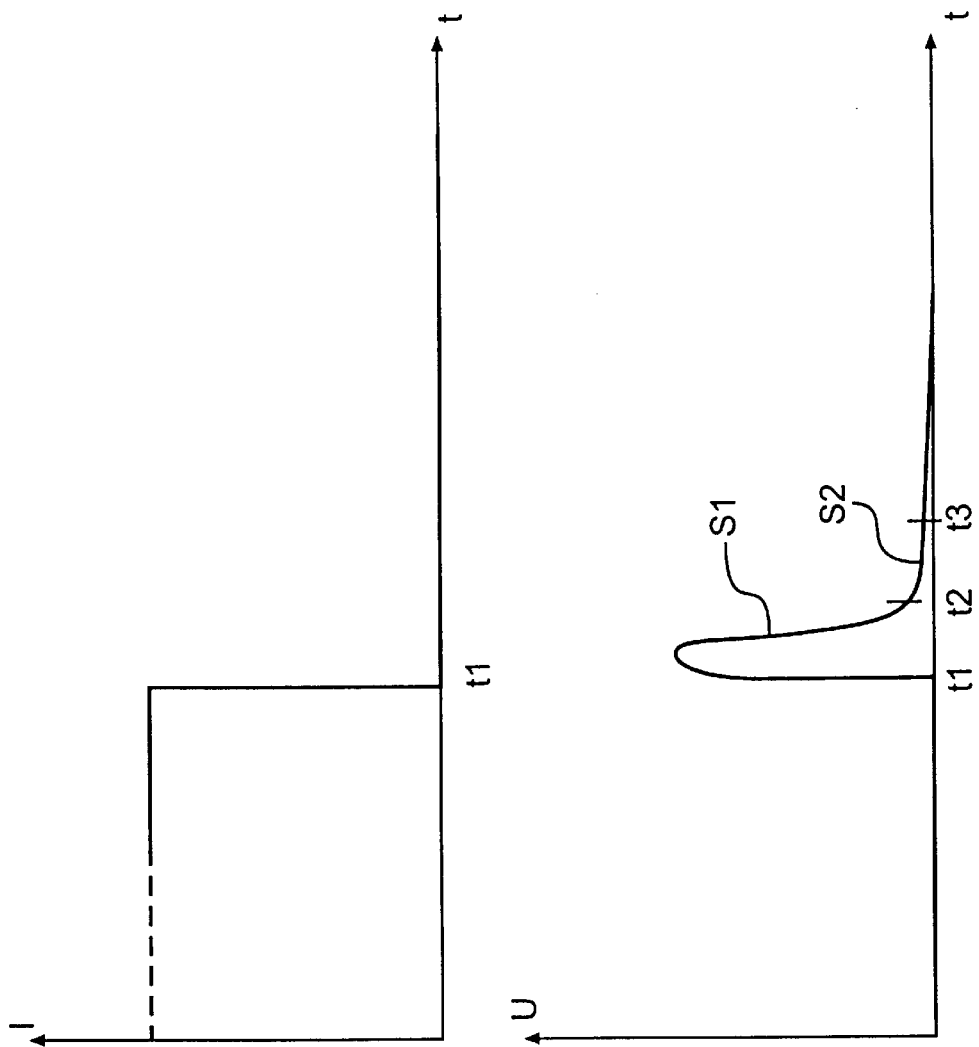
FIG. 2 shows the voltage induced in a receiver coil when the supply voltage of the transmitter coil is interrupted.

The evaluation of the various dimensions is performed according to the method described in the summary of the invention. FIG. 2 shows the voltage induced in a receiver coil consisting of the voltage pulses S1 and S2.

Based on the center c1 of that circular arc 56 which relates to the coils 5, 6 and the measuring region MV and the center c2 of that circular arc 78 which relates to the coils 7, 8 and measuring region MH, and the distance A between these centers, the width D1 of the measuring objects can be determined according to $$D1 = A - (MV + MH)$$

On the basis of given reference points for MÖ and MU and the distance between these, the height D2 of the measuring object can also be determined in a corresponding way.

The lateral position of the measuring object in relation to the mid-point on the line between the given reference points can thus be determined to be $$SL = MV - MH$$

and in a corresponding way also the vertical position HL can also be determined.

A plurality of different embodiments as regards the number of transmitter coils, receiver coils and their mutual location may be used within the scope of the invention. Examples of this are described in U.S. patent application Ser. No. 09/051,333.

Figure 3:
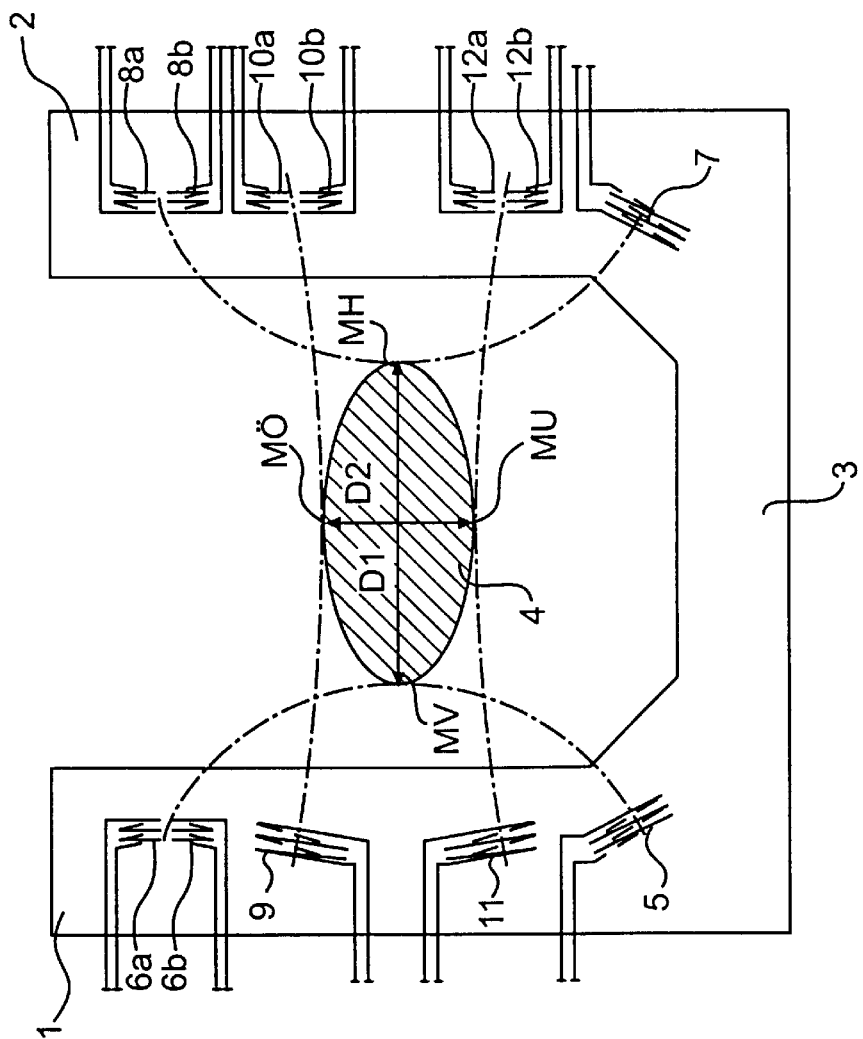
FIGS. 3 and 4 show alternative embodiments of the U sensor.

If it is desired to obtain more information about the shape of the measuring object than what can be read from the U sensor according to FIG. 1, an embodiment according to FIG. 3 may be used. Here, the receiver coils 6 and 8 according to FIG. 1 are replaced by two adjacent coils 6a, 6b and 8a, 8b, respectively, placed on respective sides of the respective circular arcs. In a corresponding way, the receiver coils 10 and 12 are replaced by adjacent coils 10a, 10b and 12a, 12b, respectively, The center lines of the coils are substantially parallel to each other and parallel to the above-mentioned symmetry lines. The sum of the voltages induced in the receiver coils 6a and 6b provides information about the measure MV in the same way as the receiver coil 6 according to FIG. 1. In a corresponding way the sum of the voltages induced in the receiver coils 8a and 8b provides information about the measure MÖ, and the sum of the voltages induced in the receiver coils 10a and 10b provides information about MH, and the sum of the voltages induced in the receiver coils 12a and 12b provides information about MU.

The advantage of the divided receiver coils is that, by studying the relationship between the voltage induced in the receiver coils 6a, 6b and 8a, 8b, 10a, 10b and 12a, 12b, respectively, the shape of the measuring object may be obtained.

Figure 4:
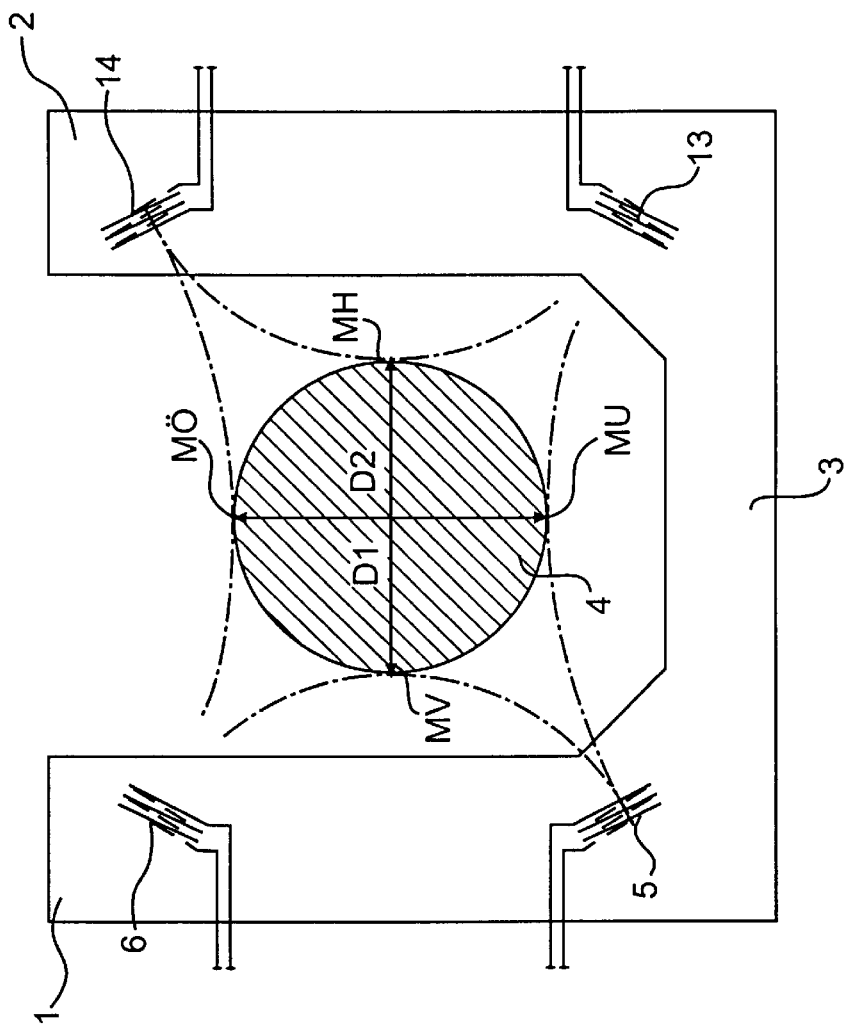

If the measuring object has a limited eccentricity, an embodiment according to FIG. 4 may be used. A transmitter coil 5 generates a magnetic field which provides field lines parallel to both the measuring regions corresponding to the MV and MU. This means that voltages are induced in the receiver coil 6 and a receiver coil 13 when the supply current to the transmitter coil is interrupted. In a corresponding way, a transmitter coil 14 generates field lines which are parallel to both the measuring regions corresponding to MH and MÖ. A voltage is then induced in the same receiver coils 6 and 13 when the supply current in the transmitter coil 14 is interrupted.

Figure 5:
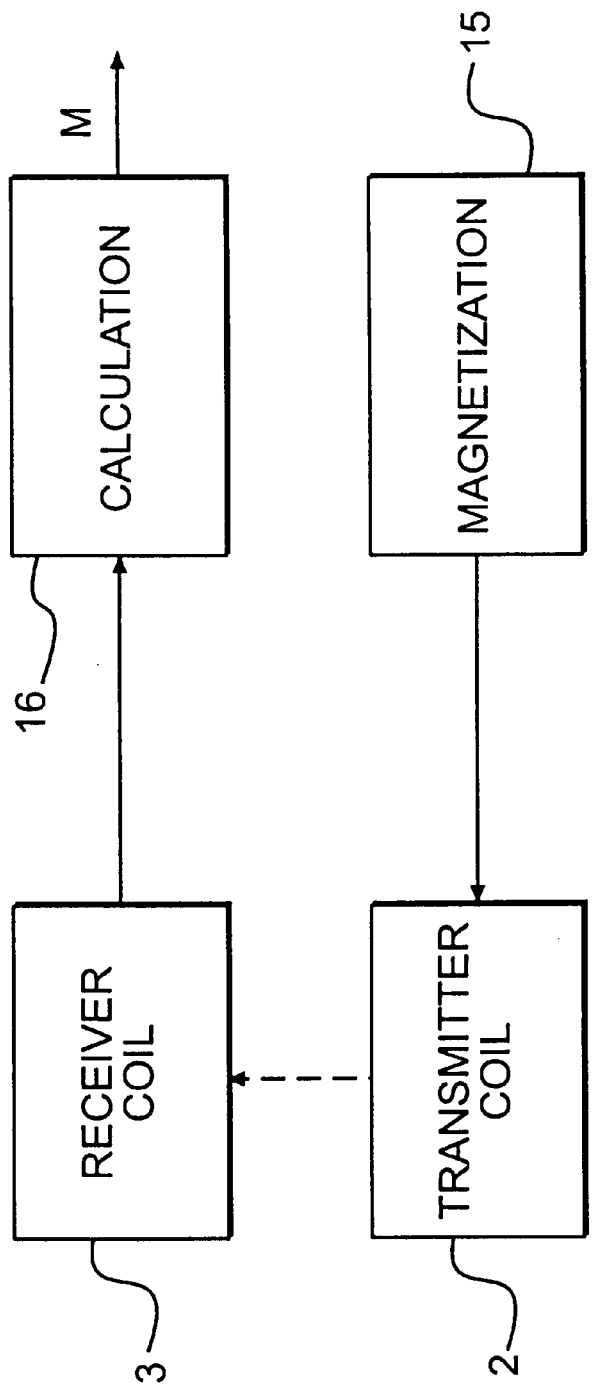
FIG. 5 shows the units included in a device according to the invention.

A measurement process by means of a device according to the invention, which comprises generation of supply current to the transmitter coils, measurement and evaluation of the voltage induced across the receiver coils, is carried out by conventional methods which may be analog, digital, or a combination of digital and analog techniques. For example, the generation of the supply current and the integration of the induced voltages are carried out using analog electronics whereas the evaluation of the integrated signals with respect to the dimensions and position of the measuring object is per-formed with the aid of digital technique in a microprocessor. Thus, for a device according to the invention to function, there are required, in principle, according to FIG. 5, in addition to transmitter and receiver coils, a magnetization unit 15 for magnetization of the transmitter coil and a calculating unit 16.

What is claimed is:

1. An apparatus for inductive measurement of a measuring object, comprising:

a U-shaped structure including two branches and a retaining part arranged therebetween, the measuring object being centrally arranged in the U-shaped structure;

at least one pair of associated coils including a transmitter coil and a receiver coil fixed to each branch of the U-shaped structure, the transmitter coil generating a time varying magnetic field tangential to said measuring object wherein a voltage induced in the receiver coil by said field is based on a location of the transmitter coil, the receiver coil, said tangential field and an outer surface of the measuring object relative to each other.

2. The apparatus according to claim 1, further comprising an integrated magnetization unit which delivers a constant current in the transmitter coil, the current being of such duration that the magnetic field can be regarded as quasi-stationary, and that the time-varying magnetic field arises when the constant current is interrupted.

3. The apparatus according to claim 1, wherein the transmitter coil is placed in the U-shaped structure in such a way that field lines generated by the transmitter coil extend in parallel with a measuring region on the outer surface measuring object.

4. The apparatus according to claim 3, wherein the transmitter coil is placed so that field lines which emanate from the transmitter coil extend in parallel with more than one measuring region.

5. The apparatus according to claim 1, wherein, in an associated pair of coils, the transmitter coil and the receiver coil are arranged substantially symmetrically on different sides of a symmetry line perpendicularly extending from a measuring region within said U-shaped structure and wherein the transmitter coil, the measuring region and the receiver coil are placed on substantially the same circular arc, facing outwardly from the measuring region, with a center on the symmetry line.

6. The apparatus according to claim 5, wherein for each pair of associated transmitter and receiver coils, the receiver coil comprises two receiver coils placed on respective sides of the circular arc and with substantially parallel center lines which are parallel to the symmetry lines.

7. An apparatus for inductive measurement of the measuring object, comprising:

a U-shaped structure including two branches and a retaining part arranged therebetween, the measuring object being centrally arranged in the U-shaped structure;

at least one pair of associated coils including a transmitter coil and a receiver coil fixed to the branches of the U-shaped structure, the transmitter coil generating a time varying magnetic field wherein a voltage induced in the receiver coil is based on a location of the transmitter coil, the receiver coil and an outer surface of the measuring object relative to each other;

wherein the transmitter coil is placed in the U-shaped structure in such a way that field lines generated by the transmitter coil extend in parallel with a measuring region on the outer surface of the measuring object; and wherein the receiver coil of an associated pair of coils is placed in the U-shaped structure so that the field lines extending in parallel with the measuring region and generated by the transmitter coil will traverse the receiver coil.

8. The apparatus according to claim 7, further comprises an integrated calculating unit which receives the voltage induced in the receiver coil, in connection with the current in the transmitter coil being interrupted at a time t1, consisting of a voltage pulse S1 for a time t1–t2 and a slowly decreasing voltage pulse S2 starting at time t2, as an input signal, and wherein the calculating unit calculates a measure M of the position of the measuring object on a symmetry line perpendicular to the measuring region of the measuring object according to $$M = a \cdot \int_{t1}^{t2} S1 \cdot dt + b \cdot \int_{t2}^{t3} S2 \cdot dt$$

where time t3 is selected so that the time t3–t2 is of the same order of magnitude as the time t2–t1 and where the coefficients a and b are selected after calibration with measuring objects made of materials of different electrical conductivity so that the difference in M between the materials becomes as small as possible.

* * * * *